United States Patent
Yamashita 4,029,397

June 14, 1977

[54] RETROFOCUS-TYPE WIDE-ANGLE PHOTOGRAPHIC LENS SYSTEM

[75] Inventor: Nobuo Yamashita, Tama, Japan

[73] Assignee: Olympus Optical Co., Ltd., Tokyo, Japan

[22] Filed: Mar. 19, 1974

[21] Appl. No.: 452,670

[30] Foreign Application Priority Data

Mar. 20, 1973  Japan .............................. 48-32213

[52] U.S. Cl. ............................................. 350/214
[51] Int. Cl.² ........................................ G02B 13/04
[58] Field of Search ................... 350/214, 215, 46

[56] References Cited

UNITED STATES PATENTS

| | | | |
|---|---|---|---|
| 3,736,049 | 5/1973 | Shimizu | 350/214 |
| 3,748,021 | 7/1973 | Tajima et al. | 350/214 |
| 3,748,022 | 7/1973 | Tajima | 350/214 |

*Primary Examiner*—John K. Corbin
*Assistant Examiner*—Conrad Clark
*Attorney, Agent, or Firm*—Cushman, Darby & Cushman

[57] ABSTRACT

A retrofocus-type wide-angle photographic lens system having a predetermined airspace in said lens system and arranged to be focused on an object at a short distance and, at the same time, to prevent aggravation of aberrations by moving a rear lens group positioned on the image side of said airspace toward a front lens group positioned on the object side of said airspace.

7 Claims, 15 Drawing Figures

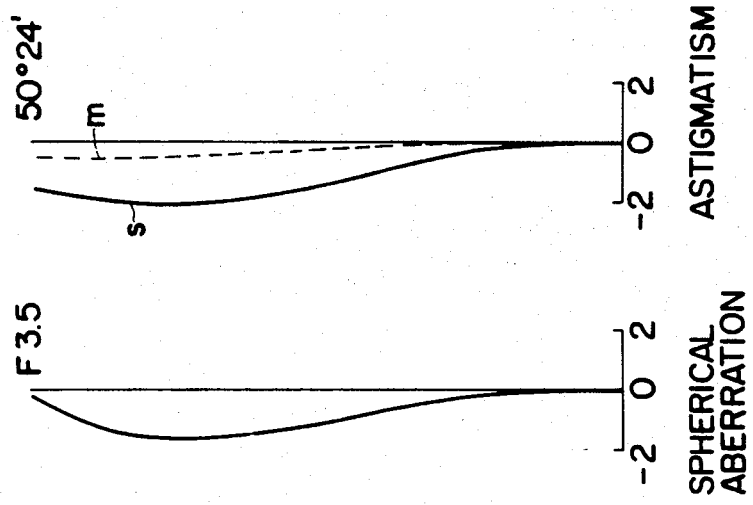
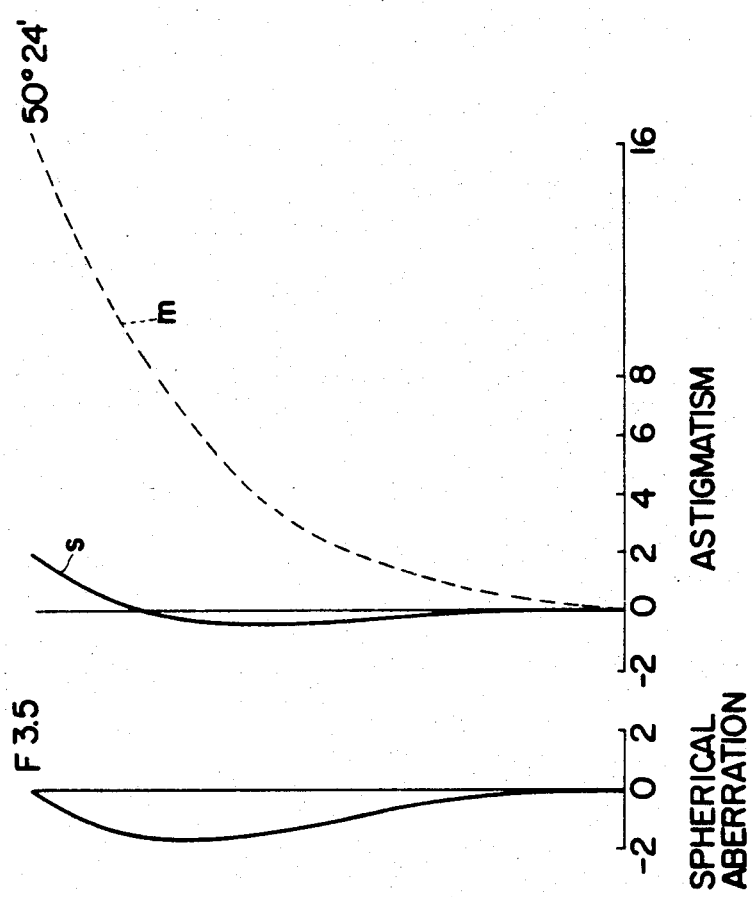

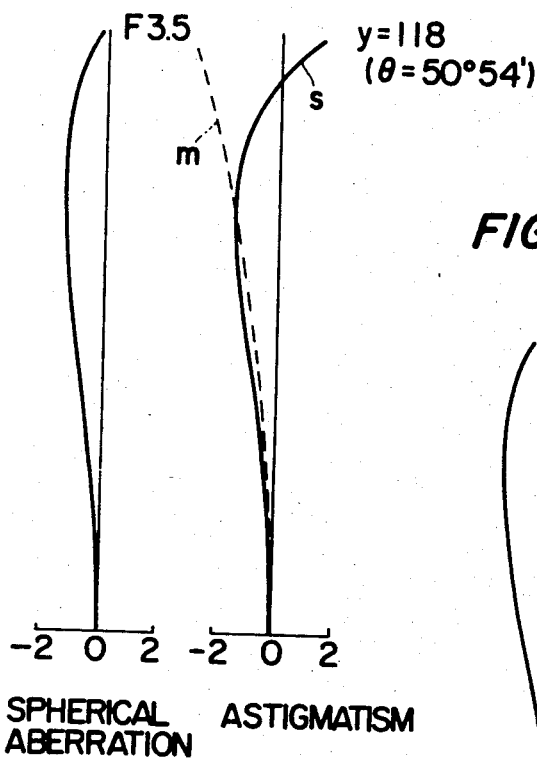
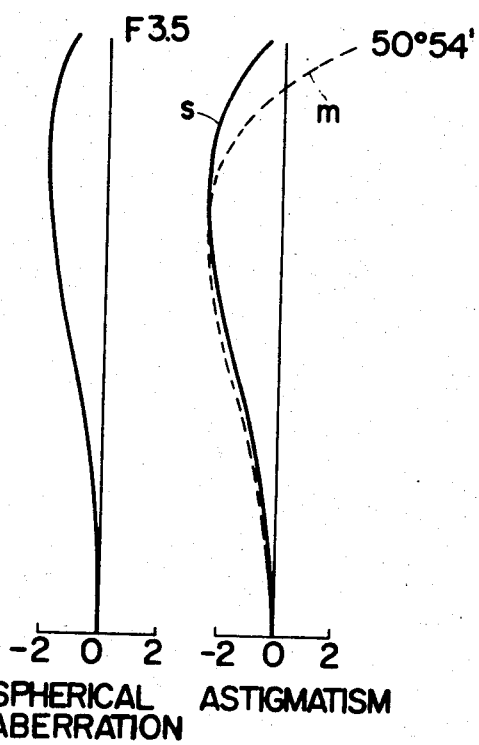

SPHERICAL ABERRATION  ASTIGMATISM

RETROFOCUS-TYPE WIDE-ANGLE PHOTOGRAPHIC LENS SYSTEM

BACKGROUND OF THE INVENTION

1. Field of the Invention

The present invention relates to a photographic lens system and, more particularly, to a retrofocus-type wide-angle photographic lens system arranged to correct aberrations which become unfavourable when focusing on an object at a short distance.

2. Description of the Prior Art

As wide-angle photographic lens systems, retrofocus-type wide-angle lens systems having a negative lens group as a front lens group and a positive lens group as a rear lens group are widely used because of reasons that the back focal length can be made long, a flat image can be obtained over a wide field angle, and so forth. Due to the fact, however, that photographic lens systems are generally designed so that aberrations can be favourably corrected for an object at an infinite distance, abberations become considerably unfavourable from the center of the field toward the marginal portion when the above-mentioned retrofocus-type lens system is focused on an object at a short distance by advancing the lens system as a whole in the same way as the case of focusing in general. In the above case, there is a tendency as described below when aberrations become unfavourable. That is, especially sagittal astigmatism is over-corrected, meridional astigmatism is remarkably over-corrected and spherical aberration is under-corrected. As correcting means for unfavourable aberrations which occur when the retrofocus-type lens system having the above-mentioned characteristics is focused on an object at a short distance, the following methods are known. One method is to divide the lens system into two groups and to focus by advancing the lens system as a whole by reducing the airspace between said two lens groups. Another method is to focus by moving a pre-determined lens in the lens system at the same time when the lens system as a whole is advanced. However, those lens systems for which the above-mentioned correcting means are adopted have disadvantages that the construction of the focusing mechanism becomes very complicated compared with the focusing mechanism of general lens systems and the outer diameter of the lens mount becomes large because said lens systems require both of the moving mechanism for advancing the lens system as a whole and mechanism for moving a part of lenses in the lens system cooperating with the former moving mechanism for advancing the lens system as a whole.

SUMMARY OF THE INVENTION

It is, therefore, a principal object of the present invention to provide a retrofocus-type wide-angle photographic lens system having an airspace in said lens system and arranged to be focused on an object at a short distance and to correct aggravation of aberrations, which occurs when focusing, by moving the lens group in rear of said airspace (rear lens group) toward the lens group in front of said airspace (front lens group).

Besides, the content of the present invention is described below referring to FIG. 1 which is a figure for explaining the principle of the lens system according to the present invention. In FIG. 1, numeral 1 designates a front negative lens group and numeral 2 designates a rear positive lens group. When photographing an object at a short distance, the front lens group 1 is kept fixed and only the rear lens group 2 is moved toward the front lens group for the purposes of focusing and correcting aggravation of aberrations which occurs in close-up photographing. Due to the fact that, in case of retrofocus-type wide-angle lens systems, aggravation of meridional astigmatism is large in close-up photographing, the position to change the airspace between lenses should be decided at such airspace where spherical aberration and sagittal astigmatism of the lens system when said airspace between lenses is reduced are scarcely aggravated compared with spherical aberration and sagittal astigmatism for an object at an infinite distance and, moreover, aggravation of meridional astigmatism can be corrected largely. The amount of aggravation of meridional astigmatism at the marginal portion becomes as follows. In this type of lens system, meridional astigmatism when focused on an object at a short distance is aggravated in the direction of over-correction. Therefore, if meridional astigmatism when focused on an object at a short distance is represented by reference symbol $(AS_M)_{CL}$ and meridional astigmatism when focused on an object at an infinite distance is represented by reference symbol $(AS_M)_\infty$, the above-mentioned aggravation is expressed as follows.

$$[(AS_M)_{CL} - (AS_M)_\infty]$$

Besides, in the lens system according to the present invention, only the rear lens group is moved toward the front lens group, the airspace between the front and rear lens groups becomes smaller when focusing on an object at a short distance. Therefore, when the advancing amount of the rear lens group at that time is represented by a reference symbol $\Delta$, the amount of change of said airspace becomes $-\Delta$. When the amount of change of aberration corresponding to a unit amount of change of the airspace is called a coefficient of correction, the above-mentioned airspace to be reduced should be decided, in order to attain the object of the present invention, as an airspace at which coefficients of correction for spherical aberration and for sagittal astigmatism are small and the coefficient of correction for meridional astigmatism is large. Besides, as $\Delta$ is negative as described in the above, said airspace is decided so that the above-mentioned amount of aggravation of astigmatism $[(AS_M)_{CL} - (AS_M)_\infty]$ and above-mentioned coefficient of correction for meridional astigmatism will have the same plus or minus sign. Besides, it is desirable that said airspace is decided so that the quotient when the amount of aggravation of meridional astigmatism $[(AS_M)_{CL} - (AS_M)_\infty]$ is divided by the above-mentioned amount of change of airspace $\Delta$ becomes approximately equal to the above-mentioned coefficient of correction for meridional astigmatism.

In the following, the relation between the advancing amount of the rear lens group and the lens system as a whole is described. When the focal length of the front lens group is represented by reference symbol $f_1$, the focal length of the rear lens group is represented by reference symbol $f_2$, magnifications of the front and rear lens groups are represented by reference symbols $\beta_1$ and $\beta_2$, magnification of the lens system as a whole is represented by reference symbol $\beta$, principal points on front and rear sides of the front and rear lens groups are respectively represented by reference symbols $H_1$, $H_1'$, $H_2$ and $H_2'$, the object is represented by reference symbol O, the image focused by the front lens group is represented by reference symbol O' and the image of the object O focused by the lens system as a whole is represented by reference symbol O'', the following formulas are obtained for the rear lens group based on the relation shown in FIG. 1.

$$L = b_2 - a_2 + H_2H_2' \quad (1)$$
$$1/b_2 = 1/a_2 + 1/f_2 \quad (2)$$
$$b_2/a_2 = \beta_2 \quad (3)$$

When the above formulas (1), (2) and (3) are differentiated and substituted, the following formula is obtained.

$$(dL/db_2) = 1 - (1/\beta_2^2) \quad (4)$$

In the same way, the following formulas are obtained for the front lens group.

$$1/b_1 = 1/a_1 + 1/f_1 \quad (5)$$
$$b_1/a_1 = \beta_1 \quad (6)$$

Therefore, from formulas (5) and (6), the following formula is obtained.

$$(db_1/da_1) = \beta_1^2 \quad (7)$$

As the lens system is focused by advancing the rear lens group, the following formula is obtained from the relation between amounts of change of $O'H_2$ and $O'O''$ caused by change of the image focused by the front lens group when the distance from the object O to $H_1$ is changed.

$$-db_1 = dL \quad (8)$$

From the above formulas (4), (7) and (8), the following formula is obtained.

$$\frac{db_2}{da_2} = \frac{-\beta_1^2 \beta_2^2}{\beta_2^2 - 1} = \frac{-\beta^2}{\beta_2^2 - 1} \quad (9)$$

When it is presumed that the rear lens group is advanced by $\Delta$ when the distance OH from the lens system to the object is changed by $\Delta_a$, the following formula is obtained from the above formula (9).

$$\Delta = \frac{-\beta^2}{\beta_2^2 - 1} \Delta_a \quad (10)$$

Besides, by considering the case that the lens system as a whole is advanced, the relation between the advancing amount $\Delta_0$ at that time and the amount of change $\Delta_a$ of the distance to the object is shown by the following formula.

$$\Delta_0 = -\beta^2 \Delta_a \quad (11)$$

When the ratio of the advancing amount when only the rear lens group is advanced and the advancing amount when the lens system as a whole is advanced is represented by reference symbol K, the following formula is obtained from formulas (10) and (11).

$$K = \frac{\Delta}{\Delta_0} = \frac{1}{1 - \beta_2^2} \quad (12)$$

The fact that K becomes large means that $\Delta$, i.e., the advancing amount of the rear lens group becomes large. Therefore, it is necessary to make the airspace to be changed a large space. However, when the airspaces between lenses is made large, the diameter of the front lens becomes large and distortion and lateral chromatic aberration for the infinite distance become unfavourable. By taking the above into consideration, it is desirable to select K as $K \leq 3$. That is, it is necessary to select as $|\beta_2| \leq 0.82$ from the formula (12).

For the wide-angle photographic lens system according to the present invention as described in the above, more concrete description is given below based on preferred embodiments.

BRIEF DESCRIPTION OF THE DRAWINGS

FIGS. 4A, 4B, 5A, 5B, 6A and 6B respectively show graphs illustrating conditions of aberrations of said first embodiment; and FIGS. 7A, 7B, 8A, 8B, 9A and 9B respectively show graphs illustrating conditions of aberrations of said second embodiment.

DETAILED DESCRIPTION OF THE PREFERRED EMBODIMENTS

Figure 1:
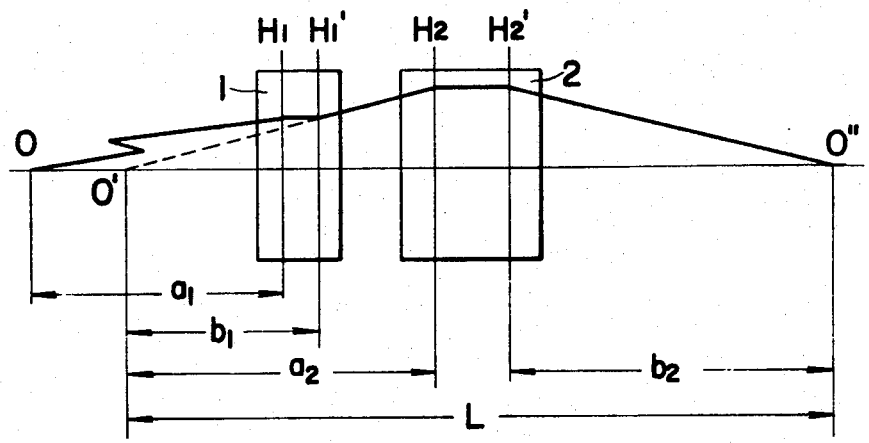
FIG. 1 shows a figure for explaining the principle of the present invention.
Figure 2:
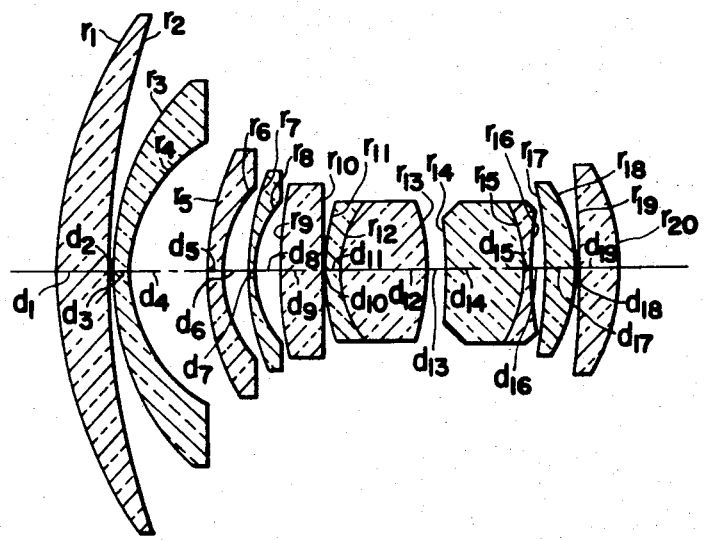
FIG. 2 shows a sectional view of a first embodiment of the present invention.
Figure 3:
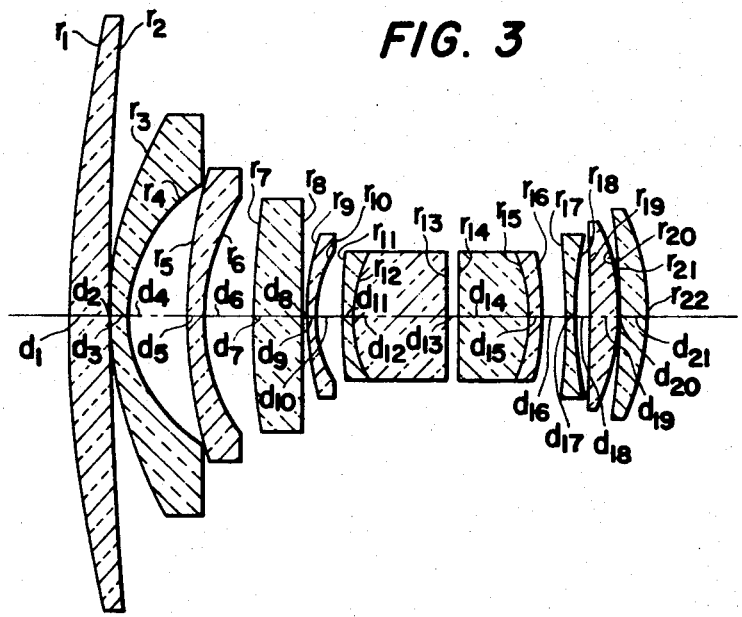
FIG. 3 shows a sectional view of a second embodiment of the present invention.

Preferred embodiments of the lens system according to the present invention are arranged as shown in FIG. 2 and FIG. 3 and their concrete numerical data are as shown below.

| Embodiment 1 |
|---|
| $f = 100$ |

| | | | |
|---|---|---|---|
| $r_1 = 198.31$ | $d_1 = 24.59$ | $n_1 = 1.6779$ | $\nu_1 = 55.33$ |
| $r_2 = 368.14$ | $d_2 = 0.55$ | | |
| $r_3 = 127.04$ | $d_3 = 8.20$ | $n_2 = 1.7859$ | $\nu_2 = 44.24$ |
| $r_4 = 63.55$ | $d_4 = $ Variable | | |
| $r_5 = 110.68$ | $d_5 = 8.20$ | $n_3 = 1.7859$ | $\nu_3 = 44.24$ |
| $r_6 = 59.68$ | $d_6 = 10.87$ | | |
| $r_7 = 113.39$ | $d_7 = 5.46$ | $n_4 = 1.7859$ | $\nu_4 = 44.24$ |
| $r_8 = 57.70$ | $d_8 = 9.72$ | | |
| $r_9 = 161.60$ | $d_9 = 20.69$ | $n_5 = 1.56732$ | $\nu_5 = 42.83$ |
| $r_{10} = -1360.89$ | $d_{10} = 0.82$ | | |
| $r_{11} = 156.12$ | $d_{11} = 5.46$ | $n_6 = 1.6968$ | $\nu_6 = 55.62$ |
| $r_{12} = 47.27$ | $d_{12} = 39.38$ | $n_7 = 1.5927$ | $\nu_7 = 35.54$ |
| $r_{13} = 77.10$ | $d_{13} = 8.74$ | | |
| $r_{14} = -133.68$ | $d_{14} = 34.90$ | $n_8 = 1.7859$ | $\nu_8 = 44.24$ |
| $r_{15} = -71.50$ | $d_{15} = 5.46$ | $n_9 = 1.84666$ | $\nu_9 = 23.88$ |
| $r_{16} = 368.68$ | $d_{16} = 3.28$ | | |
| $r_{17} = -254.99$ | $d_{17} = 14.59$ | $n_{10} = 1.618$ | $\nu_{10} = 63.38$ |
| $r_{18} = -74.43$ | $d_{18} = 0.82$ | | |
| $r_{19} = -578.40$ | $d_{19} = 15.57$ | $n_{11} = 1.618$ | $\nu_{11} = 63.38$ |
| $r_{20} = -110.25$ | | | |

In the above, reference symbols $r_1$ through $r_{20}$ respectively represent radii of curvature of respective surfaces of lenses, reference symbols $d_1$ through $d_{19}$ respectively represent thicknesses of respective lenses and airspaces between lenses, reference symbols $n_1$ through $n_{11}$ respectively represent refractive indexes for d-line of respective lenses, and reference symbols $v_1$ through $v_{11}$ respectively represent Abbe's numbers of respective lenses.

Embodiment 2

$f = 100$

| | | | |
|---|---|---|---|
| $r_1 = 569.68$ | | | |
| | $d_1 = 18.66$ | $n_1 = 1.834$ | $v_1 = 37.19$ |
| $r_2 = 1312.90$ | | | |
| | $d_2 = 1.10$ | | |
| $r_3 = 172.20$ | | | |
| | $d_3 = 8.78$ | $n_2 = 1.67$ | $v_2 = 57.33$ |
| $r_4 = 69.51$ | | | |
| | $d_4 = 26.89$ | | |
| $r_5 = 178.55$ | | | |
| | $d_5 = 8.67$ | $n_3 = 1.67$ | $v_3 = 57.33$ |
| $r_6 = 99.74$ | | | |
| | $d_6 = 23.27$ | | |
| $r_7 = 426.56$ | | | |
| | $d_7 = 23.33$ | $n_4 = 1.804$ | $v_4 = 46.57$ |
| $r_8 = -2013.62$ | | | |
| | $d_8 = 1.10$ | | |
| $r_9 = 106.36$ | | | |
| | $d_9 = 5.49$ | $n_5 = 1.6968$ | $v_5 = 55.62$ |
| $r_{10} = 56.06$ | | | |
| | $d_{10} = 9.93$ | | |
| $r_{11} = 149.21$ | | | |
| | $d_{11} = 5.49$ | $n_6 = 1.6968$ | $v_6 = 55.62$ |
| $r_{12} = 52.82$ | | | |
| | $d_{12} = 45.39$ | $n_7 = 1.5927$ | $v_7 = 35.54$ |
| $r_{13} = 2175.70$ | | | |
| | $d_{13} = 5.49$ | | |
| $r_{14} = 873.97$ | | | |
| | $d_{14} = 32.93$ | $n_8 = 1.64$ | $v_8 = 60.25$ |
| $r_{15} = 75.30$ | | | |
| | $d_{15} = 5.49$ | $n_9 = 1.51454$ | $v_9 = 54.69$ |
| $r_{16} = -108.45$ | | | |
| | $d_{16}$ = Variable | | |
| $r_{17} = -186.60$ | | | |
| | $d_{17} = 5.49$ | $n_{10} = 1.80518$ | $v_{10} = 25.43$ |
| $r_{18} = 229.47$ | | | |
| | $d_{18} = 5.49$ | | |
| $r_{19} = -5246.59$ | | | |
| | $d_{19} = 13.72$ | $n_{11} = 1.618$ | $v_{11} = 63.38$ |
| $r_{20} = -98.06$ | | | |
| | $d_{20} = 0.82$ | | |
| $r_{21} = -260.05$ | | | |
| | $d_{21} = 12.35$ | $n_{12} = 1.618$ | $v_{12} = 63.38$ |
| $r_{22} = -109.93$ | | | |

In the above, reference symbols $r_1$ through $r_{22}$ respectively represent radii of curvature of respective surfaces of lenses, reference symbols $d_1$ through $d_{21}$ respectively represent thicknesses of respective lenses and airspaces between lenses, reference symbols $n_1$ through $n_{12}$ respectively represent refractive indexes of respective lenses for d-line, and reference symbols $v_1$ through $v_{12}$ respectively represent Abbe's numbers of respective lenses.

The embodiment 1 is arranged by deciding the airspace $d_4$ in the diverging lens group as the airspace to be changed. When the distance to the object is infinitely large, said airspace is $d_4 = 35.10$ and magnification of the rear lens group is $\beta_2 = -0.455$. When this lens system is focused on an object at a short distance and the distance to said object is 1.134 m ($\beta = -0.088$), said airspace is $d_4 = 24.40$.

The embodiment 2 is arranged by deciding the airspace $d_{16}$ in the converging lens group as the airspace to be changed. When the distance to the object is infinitely large, the value of said airspace is $d_{16} = 12.07$ and magnification of the rear lens group is $\beta_2 = 0.456$. When this lens system is focused on an object at a short distance and the distance to the object is 1.646 m ($\beta = -0.058$), said airspace is $d_{16} = 4.84$.

Figure 4A:
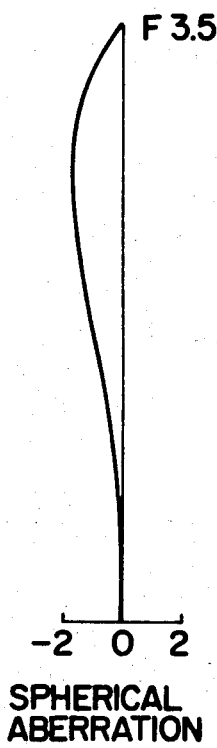
Figure 4B:
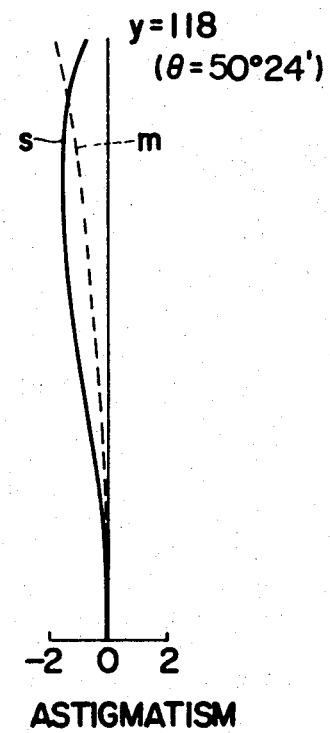
Figure 8A:
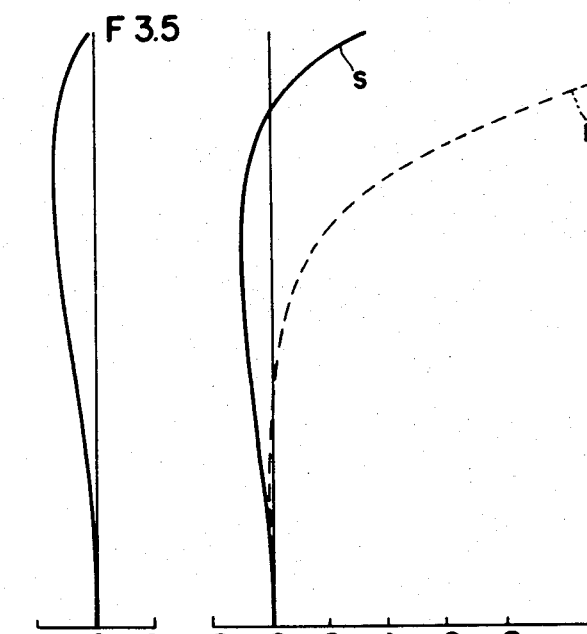
Figure 8B:
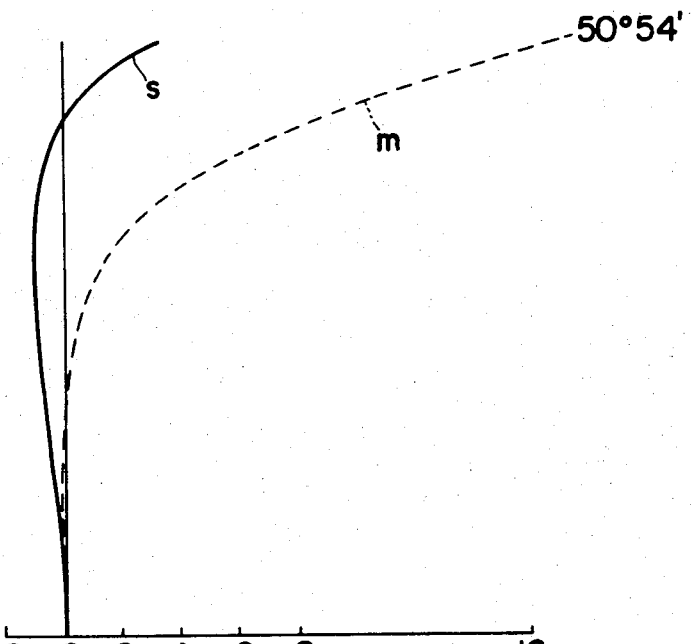

Conditions of aberrations for the above-mentioned embodiment 1 are shown in FIGS. 4A, 4B, 5A, 5B, 6A and 6B. FIGS. 4A and 4B show abberations when the distance to the object is infinitely large. FIGS. 5A and 5B show aberrations when the distance to the object is 1.134 m and the lens system is focused by advancing the lens system as a whole. FIGS. 6A and 6B show aberrations when the distance to the object is also 1.134 m but only the rear lens group is advanced for focusing. FIGS. 7A, 7B, 8A, 8B, 9A and 9B are related with the embodiment 2. FIGS. 7A and 7B show aberrations when the distance to the object is infinitely large, FIGS. 8A and 8B show aberrations when the distance to the object is 1.646 m and the lens system as a whole is advanced for focusing, and FIGS. 9A and 9B show aberrations when said distance is also 1.646 m but only the rear lens group is advanced for focusing.

As it is evident from the above aberration curves, lens systems shown by embodiments 1 and 2 which are designed according to the present invention cause almost no aggravation of spherical aberration or sagittal astigmatism even in case of close-up photographing.

Besides, meridional astigmatism, which was considerably aggravated as shown in FIG. 5B and FIG. 8B in case of the conventional method, is also corrected very favourably in case of the lens system according to the present invention as it is evident from FIG. 6B and FIG. 9B.

I claim:

1. A retrofocus-type wide-angle photographic lens system comprising a front lens group and rear lens group arranged on both sides of an airspace, said front lens group being arranged on the object side of said airspace and said rear lens group being arranged on the image side of said airspace, said airspace being selected such that coefficients of correction for spherical aberration and sagittal astigmatism, when said rear lens group is moved toward said front lens group, are small and the coefficient of correction for meridional astigmatism at that time is large, said retrofocus-type wide-angle photographic lens system being arranged so that focusing in close-up photographing and correction of aberrations can be both attained by moving said rear lens group toward said front lens group.

2. A retrofocus-type wide-angle photographic lens system according to the claim 1 wherein said airspace is decided at a position where coefficients of correction for spherical aberration and sagittal astigmatism, when said rear lens group is moved toward said front lens group, are small and the coefficient of correction for meridional astigmatism at that time is approximately equal to the quotient obtained when the amount of aggravation of meridional astigmatism is divided by the amount of movement of said rear lens group.

3. A retrofocus-type wide-angle photographic lens system according to the claim 1 wherein said airspace is decided in the diverging lens group.

4. A retrofocus-type wide-angle photographic lens system according to the claim 1 wherein said airspace is decided in the converging lens group.

5. A retrofocus-type wide-angle photographic lens system according to the claim 1 wherein magnification of said rear lens group does not exceed 0.82.

6. A retrofocus-type wide-angle photographic lens system comprising nine lens components wherein a first lens component being a positive meniscus lens, a second, third and fourth lens components respectively being negative meniscus lenses, a fifth lens component being a positive lens, a sixth lens component being a cemented positive doublet lens, a seventh lens component being a cemented negative doublet lens, and an eight and ninth lens components being positive meniscus lenses, said retrofocus-type wide-angle photographic lens system having numerical data as given below and being arranged to move a rear lens group comprising said third through ninth lens components toward a front lens group comprising said first and second lens components at the time when focusing on an object at a short distance Table

| $f = 100$ | | | |
|---|---|---|---|
| $r_1 = 198.31$ | $d_1 = 24.59$ | $n_1 = 1.6779$ | $\nu_1 = 55.33$ |
| $r_2 = 368.14$ | $d_2 = 0.55$ | | |
| $r_3 = 127.04$ | $d_3 = 8.20$ | $n_2 = 1.7859$ | $\nu_2 = 44.24$ |
| $r_4 = 63.55$ | $d_4 = $ Variable | | |
| $r_5 = 110.68$ | $d_5 = 8.20$ | $n_3 = 1.7859$ | $\nu_3 = 44.24$ |
| $r_6 = 59.68$ | $d_6 = 10.87$ | | |
| $r_7 = 113.39$ | $d_7 = 5.46$ | $n_4 = 1.7859$ | $\nu_4 = 44.24$ |
| $r_8 = 57.70$ | $d_8 = 9.72$ | | |
| $r_9 = 161.60$ | $d_9 = 20.69$ | $n_5 = 1.56732$ | $\nu_5 = 42.83$ |
| $r_{10} = -1360.89$ | $d_{10} = 0.82$ | | |
| $r_{11} = 156.12$ | $d_{11} = 5.46$ | $n_6 = 1.6968$ | $\nu_6 = 55.62$ |
| $r_{12} = 47.27$ | $d_{12} = 39.38$ | $n_7 = 1.5927$ | $\nu_7 = 35.54$ |
| $r_{13} = -77.10$ | $d_{13} = 8.74$ | | |
| $r_{14} = -133.68$ | $d_{14} = 34.90$ | $n_8 = 1.7859$ | $\nu_8 = 44.24$ |
| $r_{15} = -71.50$ | $d_{15} = 5.46$ | $n_9 = 1.84666$ | $\nu_9 = 23.88$ |
| $r_{16} = 368.68$ | $d_{16} = 3.28$ | | |
| $r_{17} = -254.99$ | $d_{17} = 14.59$ | $n_{10} = 1.618$ | $\nu_{10} = 63.38$ |
| $r_{18} = -74.43$ | $d_{18} = 0.82$ | | |
| $r_{19} = -578.40$ | $d_{19} = 15.57$ | $n_{11} = 1.618$ | $\nu_{11} = 63.38$ |
| $r_{20} = -110.25$ | | | | in the above, reference symbols $r_1$ through $r_{20}$ respectively represent radii of curvature of respective surfaces of lenses, reference symbols $d_1$ through $d_{19}$ respectively represent thicknesses of respective lenses and airspaces between lenses, reference symbols $n_1$ through $n_{11}$ respectively represent refractive indexes for d-line of respective lenses, and reference symbols $\nu_1$ through $\nu_{11}$ respectively represent Abbe's numbers of respective lenses.

7. A retrofocus-type wide-angle photographic lens system comprising ten lens components wherein a first lens component being a positive meniscus lens, a second and third lens components respectively being negative meniscus lenses, a fourth lens component being a positive lens, a fifth lens component being a negative meniscus lens, a sixth and seventh lens components being cemented positive doublet lenses, an eight lens component being a negative lens, and a ninth and tenth lens components respectively being positive lenses, said retrofocus-type wide-angle photographic lens system having numerical data as given below and being arranged to move a rear lens group comprising said eight through tenth lens components toward a front lens group comprising said first through seventh lens components at the time when focusing on an object at a short distance Table

| $f = 100$ | | | |
|---|---|---|---|
| $r_1 = 569.68$ | $d_1 = 18.66$ | $n_1 = 1.834$ | $\nu_1 = 37.19$ |
| $r_2 = 1312.90$ | $d_2 = 1.10$ | | |
| $r_3 = 172.20$ | $d_3 = 8.78$ | $n_2 = 1.67$ | $\nu_2 = 57.33$ |
| $r_4 = 69.51$ | $d_4 = 26.89$ | | |
| $r_5 = 178.55$ | $d_5 = 8.67$ | $n_3 = 1.67$ | $\nu_3 = 57.33$ |
| $r_6 = 99.74$ | $d_6 = 23.27$ | | |
| $r_7 = 426.56$ | $d_7 = 23.33$ | $n_4 = 1.804$ | $\nu_4 = 46.57$ |
| $r_8 = -2013.62$ | $d_8 = 1.10$ | | |
| $r_9 = 106.36$ | $d_9 = 5.49$ | $n_5 = 1.6968$ | $\nu_5 = 55.62$ |
| $r_{10} = 56.06$ | $d_{10} = 9.93$ | | |
| $r_{11} = 149.21$ | $d_{11} = 5.49$ | $n_6 = 1.6968$ | $\nu_6 = 55.62$ |
| $r_{12} = 52.82$ | $d_{12} = 45.39$ | $n_7 = 1.5927$ | $\nu_7 = 35.54$ |
| $r_{13} = 2175.70$ | $d_{13} = 15.49$ | | |
| $r_{14} = 873.97$ | $d_{14} = 32.93$ | $n_8 = 1.64$ | $\nu_8 = 60.25$ |
| $r_{15} = -75.30$ | $d_{15} = 5.49$ | $n_9 = 1.51434$ | $\nu_9 = 54.69$ |
| $r_{16} = -108.45$ | $d_{16} = $ Variable | | |
| $r_{17} = -186.60$ | $d_{17} = 5.49$ | $n_{10} = 1.80518$ | $\nu_{10} = 25.43$ |
| $r_{18} = 229.47$ | $d_{18} = 5.49$ | | |
| $r_{19} = -5246.59$ | $d_{19} = 13.72$ | $n_{11} = 1.618$ | $\nu_{11} = 63.38$ |
| $r_{20} = -98.06$ | $d_{20} = 0.82$ | | |
| $r_{21} = -260.05$ | $d_{21} = 12.35$ | $n_{12} = 1.618$ | $\nu_{12} = 63.38$ |
| $r_{22} = -109.93$ | | | | in the above, reference symbols $r_1$ through $r_{22}$ respectively represent radii of curvature of respective surfaces of lenses, reference symbols $d_1$ through $d_{21}$ respectively represent thicknesses of respective lenses and airspaces between lenses, reference symbols $n_1$ through $n_{12}$ respectively represent refractive indexes of respective lenses for d-line, and reference symbols $\nu_1$ through $\nu_{12}$ respectively represent Abbe's numbers of respective lenses.

* * * * *